United States Patent
Liang et al.

(10) Patent No.: US 10,292,232 B2
(45) Date of Patent: May 14, 2019

(54) LIGHT AND DISPLAY CONTENT INTEGRATION METHOD

(71) Applicant: YUTOU TECHNOLOGY (HANGZHOU) CO., LTD., Hangzhou, Zhejiang (CN)

(72) Inventors: Ningqing Liang, Hangzhou (CN); Gangying Du, Hangzhou (CN)

(73) Assignee: YUTOU TECHNOLOGY (HANGZHOU) CO. LTD., Zhejiang (CN)

( * ) Notice: Subject to any disclaimer, the term of this patent is extended or adjusted under 35 U.S.C. 154(b) by 0 days.

(21) Appl. No.: 15/741,624

(22) PCT Filed: Jun. 22, 2016

(86) PCT No.: PCT/CN2016/086789
§ 371 (c)(1),
(2) Date: Jan. 3, 2018

(87) PCT Pub. No.: WO2017/005091
PCT Pub. Date: Jan. 12, 2017

(65) Prior Publication Data
US 2018/0199410 A1    Jul. 12, 2018

(30) Foreign Application Priority Data
Jul. 7, 2015   (CN) .......................... 2015 1 0402195

(51) Int. Cl.
*G09G 3/06*    (2006.01)
*H05B 33/08*   (2006.01)
(Continued)

(52) U.S. Cl.
CPC ........... *H05B 33/0857* (2013.01); *G09G 3/06* (2013.01); *G09G 3/2007* (2013.01); *H05B 37/02* (2013.01); *Y02B 20/42* (2013.01)

(58) Field of Classification Search
CPC ...... G09G 3/06; G09G 3/2007; G09G 3/3413; G09G 3/3406; H05B 33/0857;
(Continued)

(56) References Cited

U.S. PATENT DOCUMENTS

2003/0146919 A1* 8/2003 Kawashima ......... G09G 3/3406
345/609
2007/0091111 A1* 4/2007 Gutta ....................... H04N 5/58
345/591
(Continued)

FOREIGN PATENT DOCUMENTS

| CN | 101682962 A | 3/2010 |
| CN | 201655175 U | 11/2010 |
| CN | 103561345 A | 2/2014 |

OTHER PUBLICATIONS

International Search Report, Application No. PCT/CN2016/086789 dated Sep. 9, 2016.

*Primary Examiner* — Richard J Hong
(74) *Attorney, Agent, or Firm* — The Dobrusin Law Firm, PC

(57) ABSTRACT

Disclosed is a light and display content integration method, applied to a display device. The display device is an integrated screen, comprising a display area and a light area. The light area is illuminated by an LED array located behind the display area and around a periphery of the display area. The method is configured to integrate, according to an input signal, display content of the display area and a display status of the LED array. The LED array comprises a plurality of light assembly units. The display area is partitioned into a plurality of video regions according to the amount of the light assembly units, and each of the video regions corresponds to one of the light assembly units. The present invention controls, according to different input signals, an (Continued)

output of a corresponding light signal and display signal by analyzing a type of the input signals.

8 Claims, 4 Drawing Sheets

(51) Int. Cl.
  *H05B 37/02* (2006.01)
  *G09G 3/20* (2006.01)
(58) Field of Classification Search
  CPC .. H05B 37/02; H05B 37/0218; H05B 37/029; Y02B 20/42; H04N 9/73; H04N 5/58; H04N 5/66; G06T 5/009
  See application file for complete search history.

(56) References Cited

U.S. PATENT DOCUMENTS

| | | | | |
|---|---|---|---|---|
| 2009/0225065 | A1* | 9/2009 | Overes | H05B 37/0218 345/207 |
| 2009/0322801 | A1* | 12/2009 | Kwisthout | G09G 3/3413 345/690 |
| 2010/0213873 | A1* | 8/2010 | Picard | H05B 37/029 315/297 |
| 2010/0213877 | A1* | 8/2010 | Galeazzi | H04N 9/73 315/312 |
| 2012/0051635 | A1* | 3/2012 | Kunkel | G06T 5/009 382/165 |
| 2013/0016306 | A1 | 1/2013 | Ohno et al. | |
| 2015/0092115 | A1* | 4/2015 | Micewicz | H04N 5/66 348/798 |

* cited by examiner

LIGHT AND DISPLAY CONTENT INTEGRATION METHOD

CROSS-REFERENCE TO RELATED APPLICATIONS

The present application claims priority to and the benefit of Chinese Patent Application No. CN 201510402195.7 filed on Jul. 7, 2015, the entire content of which is incorporated herein by reference.

BACKGROUND OF THE INVENTION

1. Field of the Invention

The invention relates to the field of display, and more particularly, to light and display content integration method.

2. Description of the Related Art

With regard to a technology, traditional light, together with a display, is utilized for display, wherein it is achieved in a way that light cooperates with the change of the tone and the brightness of display content. However, since limiting light of the conventional technology plays a smaller role in assisting the display, the light cannot be well integrated with the display content. Moreover, the traditional light can only cooperate with the display content in a preset specific display mode for display, having limitations and poor practicability.

SUMMARY OF THE INVENTION

Given that the foregoing problems exist in the integration of the existing light and display content, the present invention provides a method for integration of light and display content, which can intelligently adjust lighting tone according to the display content.

Specific technical schemes are as follows:

A light and display content integration method, applicable to a display device, the display device being an integrated screen, comprising a display area and a light area, wherein the light area is illuminated by an LED array located behind the display area and around a periphery of the display area, the LED array comprises a plurality of light set units, and the display area is divided into a plurality of video regions according to the number of the light set units, each video region corresponding to one light set unit:

wherein, the method for integration of light and display content comprises the following steps of:

S1. obtaining an input signal comprising a display signal and/or a light signal, then executing Step S2;

S2. analyzing a type of the input signal:

if the input signal comprises the display signal and the light signal, executing Step S3;

if the input signal is the display signal, executing Step S4;

if the input signal is the light signal, executing Step S5;

S3. outputting the input signal as an integration signal;

S4. extracting a color space of a video frame of each video region in the display area, obtaining tone data in the color space of the video frame of the video region by calculation, and generating a light signal of the light set units corresponding to the video region based on the tone data, then executing Step S6;

S5. obtaining the tone data of the light signal, and generating a display signal having the same color as the tone data based on the tone data, then executing Step S6;

S6. inserting the light signal into the display signal according to time and a corresponding relationship between the light set units and the video region, and adding a mark to the display signal to describe a feature of the display signal, so as to form the integration signal, and sending the integration signal to the display device.

Preferably, wherein the display device further comprises a boundary area located around the periphery of the display area and bordering the light area.

Preferably, wherein in Step S4, when the display signal is a dynamic video, extracting the color space of consecutive video frames of each of the video regions in the display signal, and a average value of the tone data in the color space of the consecutive video frames of the video region is calculated at a first predetermined interval, then generating the light signal of the light set unit corresponding to the video region based on the tone data.

Preferably, wherein in Step S4, when the display signal is a static image, extracting the tone data of the display signal, and generating the corresponding light signal based on the tone data, wherein the light signal is a static light signal.

Preferably, wherein in Step S4, when the display signal is a static image, RGB values are respectively divided into X intervals to form an interval with a color space of $X^3$, calculating a color histogram of the display signal, extracting Y intervals with the highest numerical values in the color histogram, and obtaining median values of the RGB values in the Y intervals, and combining median values of the Y RGB values to form a main tone color space, and mapping the Y median values into a continuous sequence to generate the light signal based on the distribution of the Y median values in the color space, each of the RGB values in the Y median values having a duration of a second preset interval, and the light signal being a dynamic light signal;

wherein, X and Y are positive integers, $2 \leq X \leq 50$, $0 \leq Y \leq X^3$

Preferably, wherein in Step S5, when the light signal is a dynamic light signal, dynamic information of a change of the light signal is obtained, and light change frequency of each of the light set units is obtained according to the dynamic information, and generating the display signal corresponding to the change frequency, so as to display a dynamic oscillogram corresponding to the change frequency.

Preferably, wherein in Step S5, when the light signal is a static light signal, the tone data of the light signal is obtained, and each light set unit corresponds to a tone value, and generating a single signal of the video region corresponding to the light set unit, and combining all the single signals to generate the display signal.

Preferably, wherein the tone data is represented in a RGB format.

Preferably, wherein performing Gaussian blur to the boundary area, such that blurriness of the boundary area is increasing from an interior of the display area to an exterior of the display area.

The above technical schemes have the advantages that:

The present technical schemes control an output of a corresponding light signal and display signal according to different input signals by analyzing a type of the input signal, so as to achieve an effect where display content and lighting tone can be intelligently adjusted, allowing the light signal and the display signal to be well integrated, thus expanding the scope of the application.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
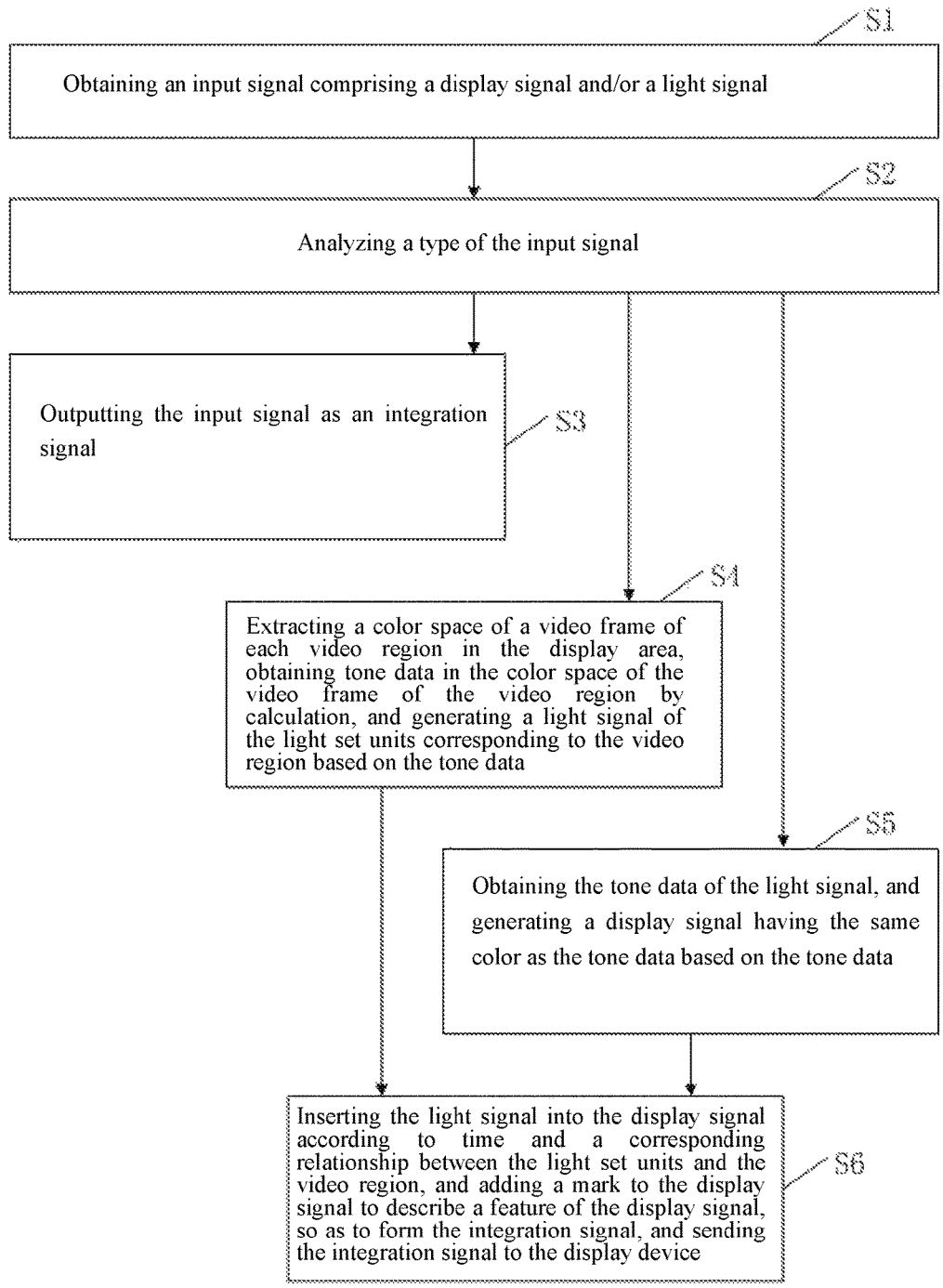
FIG. 1 is a flowchart of an embodiment of a method for integration of light and display content of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

As shown in FIG. 1, a method for integration of light and display content, applicable to a display device. The display device is an integrated screen, comprising a display area and a light area. The light area is illuminated by an LED array located behind the display area and around a periphery of the display area. Wherein, the LED array comprises a plurality of light set units, and the display area is divided into a plurality of video regions according to the number of the light set unit, each video region corresponding to one light set unit:

wherein, the method for integration of light and display content comprises the following steps of:

S1. obtaining an input signal comprising a display signal and/or a light signal, then executing Step S2;

S2. analyzing a type of the input signal:

if the input signal comprises the display signal and the light signal, executing Step S3;

if the input signal is the display signal, executing Step S4;

if the input signal is the light signal, executing Step S5;

S3. outputting the input signal as an integration signal;

S4. extracting a color space of a video frame of each video region in the display area, obtaining tone data in the color space of the video frame of the video region by calculation, and generating a light signal of the light set units corresponding to the video region based on the tone data, then executing Step S6;

S5. obtaining the tone data of the light signal, and generating a display signal having the same color as the tone data based on the tone data, then executing Step S6;

S6. inserting the light signal into the display signal according to time and a corresponding relationship between the light set units and the video region, and adding a mark to the display signal to describe a feature of the display signal, so as to form the integration signal, and sending the integration signal to the display device.

In this embodiment, the display area is located inside a screen. The light area is a screen portion excluding the display area, which is illuminated by an LED array disposed in an area behind the screen and surrounding the display area. Wherein, the LED array comprises a plurality of light set units. The display area is virtually divided into a plurality of video regions according to the number of the LED array, each video region corresponding to one light set unit. If the input signal comprises the display signal and the light signal, the input display signal and the light signal can be served as input signals that have integrated and adapted the LED array and the display area.

The present technical schemes control an output of a corresponding light signal and display signal according to different input signals by analyzing a type of the input signal, so as to achieve an effect where display content and lighting tone can be intelligently adjusted, allowing the light signal and the display signal to be well integrated, thus expanding the scope of the application.

Specifically, in the present invention, both the resolution and the definition of the display area are higher than those of the light area illuminated by the LED array. The lighting effect of the LED array is consistent with the display content in the display area by driving the LED array according to the display signal, so as to create a broad view of vision and make the display content more vivid.

In a preferred embodiment, wherein the display device further comprises a boundary area located around the periphery of the display area and bordering the light area.

In this embodiment, the display content can be divided into a dynamic video and a static image, and the light signal can be divided into a static light signal and a dynamic light signal. When the display content is the dynamic video or the static image, the boundary area located at an outer edge of the display area will integrate the display content with the lighting effect emitted by the LED array, so that the edge of the display content will be free from the interference of the light emitted by the LED array, avoiding ambiguous visual effect.

In a preferred embodiment, wherein in Step S4, when the display signal is a dynamic video, extracting the color space of consecutive video frames of each of the video regions in the display signal, and a average value of the tone data in the color space of the consecutive video frames of the video region is calculated at a first predetermined interval, then generating the light signal of the light set units corresponding to the video region based on the tone data.

Specifically, since the frame rate of the dynamic video is generally higher, when calculating the main tone of the video area, an average value of the main tones of the corresponding areas of the plurality of consecutive video frames may be calculated to improve the visual effect of the lighting. The first predetermined interval can range from 0.5 seconds to 2 seconds.

Figure 2:
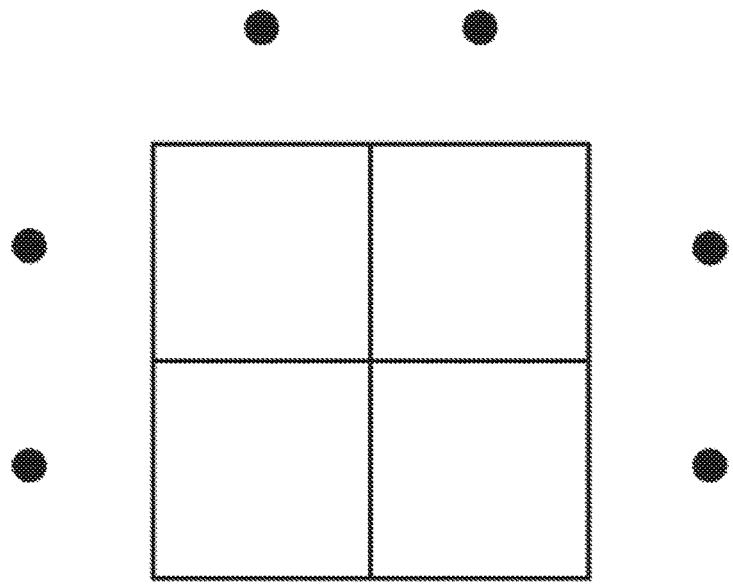
FIG. 2 is a schematic diagram of an embodiment in which a video region and light set units being uniformly zoned and arranged.
Figure 3:
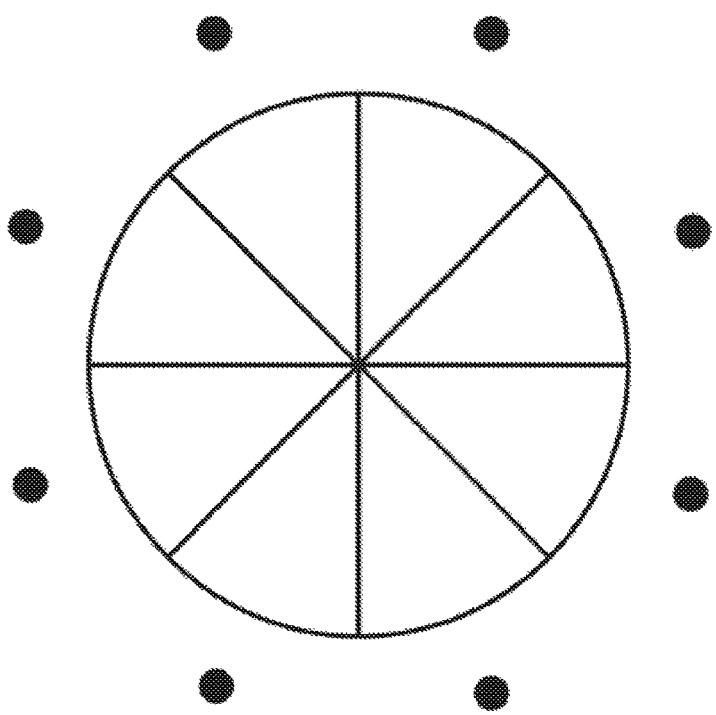
FIG. 3 is a schematic diagram of another embodiment in which a video region and light set units are uniformly zoned and arranged.

In this embodiment, when the display signal is a dynamic video, the main color tone of the video area is calculated first by making the light set units corresponding to the video regions, to generate light information of corresponding light set units, and all the light information is combined into the light signal, then a video frame of the dynamic video (display signal) is sent to the display area for display, and the light signal is sent to the LED array for display. In this embodiment, the number of the video region is equal to that of the light set units, in the meantime, in order to achieve an optimal display effect as a whole, the video region can be uniformly zoned according to the arrangement of the light set units, as shown in FIGS. 2 and 3, and in FIG. 4, the video region is non-uniformly zoned according to the arrangement of the light set units, wherein the light signal of the light set unit is corresponding to the main tone value of the video frame of the closest video region.

In a preferred embodiment, wherein in Step S4, when the display signal is a static image, extracting the tone data of the display signal, and generating the corresponding light signal based on the tone data, wherein the light signal is a static light signal.

In this embodiment, when the display signal is a static image, a full image of the static image can be calculated to obtain a single main tone value, so as to control all the light set units to operate by adopting the light signal corresponding to the main tone value.

In a preferred embodiment, wherein in Step S4, when the display signal is a static image, RGB values are respectively divided into X intervals to form an interval with a color space of $X^3$, calculating a color histogram of the display signal, extracting Y intervals with the highest numerical values in the color histogram, and obtaining median values of the RGB values in the Y intervals, and combining median values of the Y RGB values to form a main tone color space, and mapping the Y median values into a continuous sequence to generate the light signal based on the distribution of the Y median values in the color space, each of the RGB values in the Y median values having a duration of a second preset interval, and the light signal being the dynamic light signal;

wherein, X and Y are positive integers, $2 \leq X \leq 50$, $0 \leq Y \leq X^3$

Further, the second preset interval can range from 0.5 seconds to 2 seconds.

In this embodiment, when the display signal is a static image, the light set units can also be operated by using the dynamic light signal. Specifically, RGB (abbreviation for red, green, and blue, that is, red, green and blue) values are respectively divided into 10 intervals and the entire color space becomes 1000 intervals of 10*10*10. Then, the color histogram of the entire image is calculated, and 100 intervals of the highest value are taken out, to form a main tone color space with the median values of the RGB values of the 100 intervals. Based on the distribution of 100 RGB median values in the color space, starting arrangement from one direction to form a continuous sequence, and the arranged sequence is generated into corresponding light signals, and the duration of each light set unit can be adjusted according to the actual effect, wherein the duration is associated with a density of the light set unit around the display area and a relative configuration of the video region.

In a preferred embodiment, wherein in Step S5, when the light signal is a dynamic light signal, dynamic information of a change of the light signal is obtained, and light change frequency of each light set unit is obtained according to the dynamic information, and generating the display signal corresponding to the change frequency, so as to display a dynamic oscillogram corresponding to the change frequency.

In this embodiment, when the input light signal is a dynamic light signal, the video region can present an image of dynamic correlation information associated with the change of the dynamic light signal. For example, for each light set unit, the frequency of lighting change can be calculated to show the frequency change characteristics of each light set unit in a three-dimensional perspective. Since each light set unit has the same or similar frequency, and its frequency change rate is very slow, or has a stable frequency value, sinusoidal waveform can be used to represent the frequency characteristics, and color of the waveform per se can be in consistent with the color of the light set unit.

In a preferred embodiment, wherein in Step S5, when the light signal is a static light signal, the tone data of the light signal is obtained, and each light set unit corresponds to a tone value, and generating a single signal of the video region corresponding to the light set unit, and combining all the single signals to generate the display signal.

In this embodiment, when the input light signal is a static light signal, the video region can display a single signal with the same color and brightness value.

In a preferred embodiment, wherein the tone data is represented in a RGB format.

In this embodiment, the tone data represented in the RGB format can comprises lighting intensity information without being specified separately.

In a preferred embodiment, wherein performing Gaussian blur to the boundary area, such that blurriness of the boundary area increases from the inside of the display area to the outside of the display area.

In this embodiment, in order to achieve a better effect of lighting effect of integration of the video region and the corresponding light set unit, Gaussian blur processing can be performed to the boundary area, such that blurriness of the boundary area is increasing from the inside to the outside, to eliminate an obvious boundary between an entire video region and the LED array.

Figure 4:
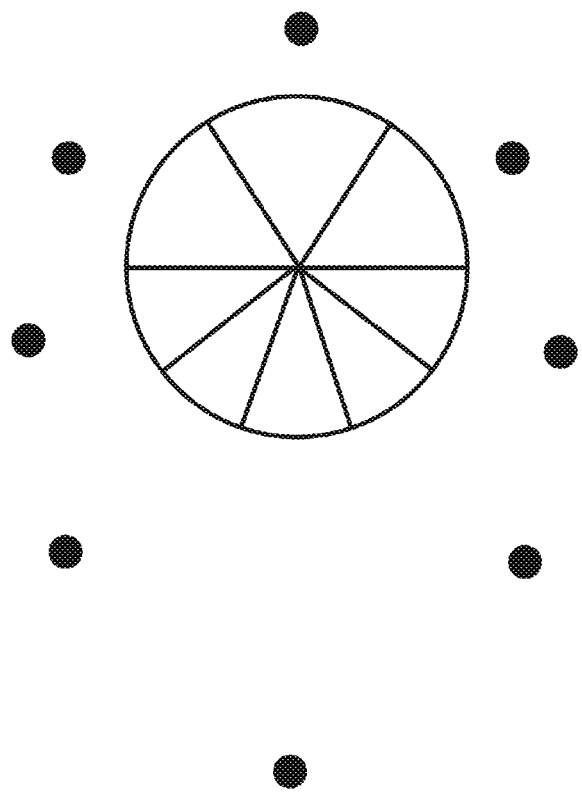
FIG. 4 is a schematic diagram of an embodiment in which a video area and light set units are non-uniformly zoned and arranged.
Figure 5:
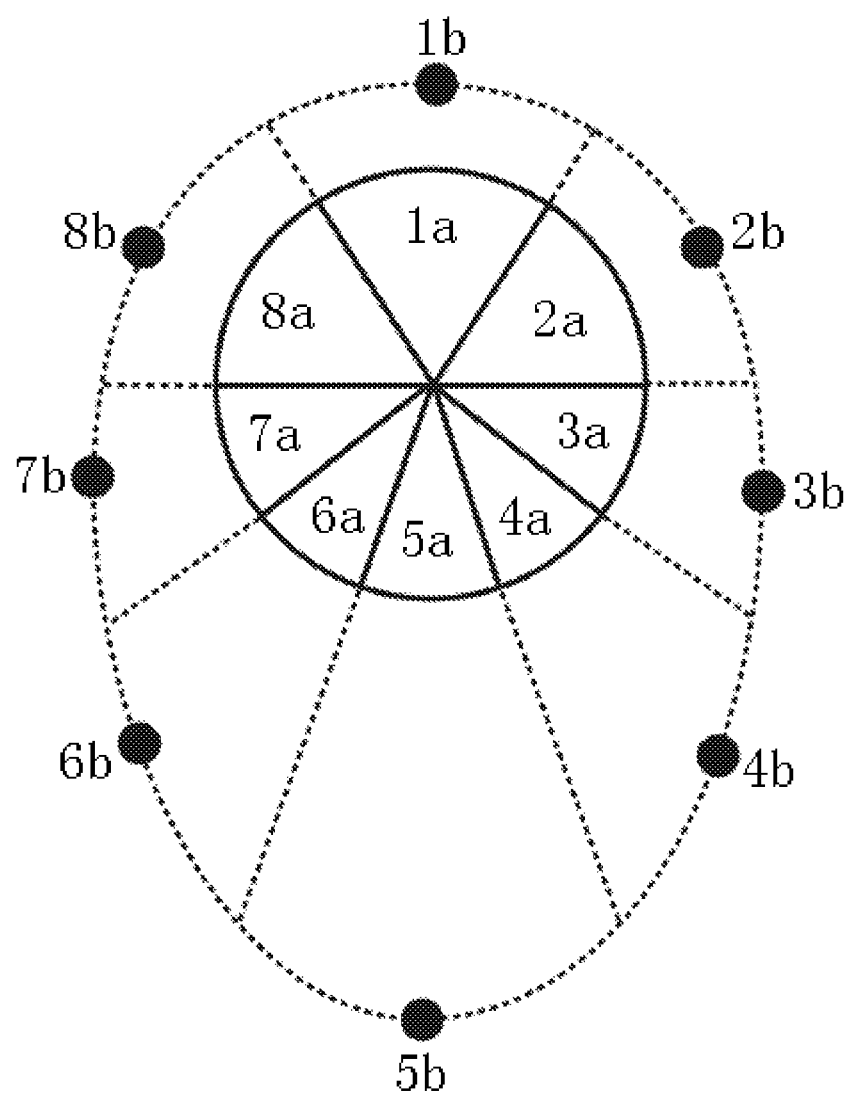
FIG. 5 is a schematic diagram of the zones of FIG. 4.

Based on the above technical schemes, further, take the following arrangement as an example: the input signal is the dynamic video, and a display device of a target comprises the display area and the light area illuminated by the LED array (as shown in FIGS. 4 and 5). Wherein, the display device is displayed in a partitioned mode and a corresponding format as shown in the FIG. 5, that is, the light set units (1b-8b) correspond to the video regions (1a-8a) with corresponding reference numerals. The specific process of obtaining the light signal is as follows: taking 1 second as the length of time and the main tone is calculated for the partitioned video regions, the RGB values can be divided into 10 segments when calculating, and then the entire color space becomes 1000 intervals of 10*10*10; calculating the color histogram of the corresponding region of all the image frames in 1 second, and taking out the interval of the largest numerical value, and taking the median value of the RGB values as a main tone of a result, wherein the median value comprises tree numerical values of the RGB; then arranging the main tone value in the same second according to the reference numeral of the light set unit to form a corresponding light signal to present a corresponding content of the light set unit.

Moreover, in order to avoid the edge of the display area becomes blur due to the interference of the LED array when displaying, a boundary area equivalent to 5% of the width of the size of the display content can be added outside the display content, and the boundary area can be filled with Tiffany blue. Adjusting the size of the video frame in which the boundary area has been added to reach a target size, then the width of the boundary area is divided into five even parts, and Gaussian Blur processing from gradient 1-2 is performed to the boundary area with parameters, the blurriness is increasing outwardly, and the outermost part is well integrated with the light area, to achieve a natural-transition effect in the boundary area.

The light signal and the display signal, having been processed by an integration method, are combined into a final overall display signal. Since the light signal changes once per second, while a frame rate of a video is much larger than 1, correspondence is done according to the time during integration, and the light signal is inserted into the display signal, and a specific mark is added to describe the signal characteristics to form an integration signal, and the integration signal is transmitted to the display signal for display.

Based on the above technical schemes, further, take the following arrangement as an example: the input signal is a static single light signal, and a target display device comprises the display area and the light area illuminated by the LED array (as shown in FIG. 3). Since light is a simple static single-value signal, the display area can be displayed in a manner that the same tone is displayed to enhance the lighting effect. The specific process of obtaining the display signal is as follows: the RGB value of the light signal is obtained first, and then the value is set as the pixel value of the overall display area. It is also possible to add a random deviation of 1/50 of the overall amplitude value to the RGB values respectively and then generate a display signal in a video frame format with a frame rate of 30 to mimic the influence of various factors on the display device in a natural state.

Due to the high resolution of the display area, the pure light area illuminated by the LED array will generate a shaper boundary. Therefore, the edge of the display area can be changed from the area size of 5% to the outermost edge, and taking 1% as a step size, and Gaussian blur processing from gradient 1-2 is performed to the boundary area with parameters, the blurriness is increasing outwardly, and the outermost part is well integrated with the light area, to achieve a natural-transition effect in the boundary area.

The light signal and the display signal, having been processed by an integration method, are combined into a final overall display signal. Since the light signal refreshes once per second, while the frame rate of a video is 30, correspondence is done according to the time during integration, and the light signal is inserted into the display signal, and a specific mark is added to describe the signal characteristics to form an integration signal, and the integration signal is transmitted to the display signal for display.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A light and display content integration method, applicable to a display device, the display device being an integrated screen, comprising a display area and a light area, wherein the light area is illuminated by an LED array located behind the display area and around a periphery of the display area, the LED array comprises a plurality of light set units, and the display area is divided into a plurality of video regions according to the number of the light set units, each video region corresponding to one light set unit:
   wherein, the method for integration of light and display content comprises the following steps of:
   S1. obtaining an input signal comprising a display signal and/or a light signal, then executing Step S2;
   S2. analyzing a type of the input signal:
   if the input signal comprises the display signal and the light signal, executing Step S3;
   if the input signal is the display signal, executing Step S4;
   if the input signal is the light signal, executing Step S5;
   S3. outputting the input signal as an integration signal;
   S4. extracting a color space of a video frame of each video region in the display area, obtaining tone data in the color space of the video frame of the video region by calculation, and generating a light signal of the light set units corresponding to the video region based on the tone data, then executing Step S6;
   S5. obtaining the tone data of the light signal, and generating a display signal having the same color as the tone data based on the tone data, then executing Step S6;
   S6. inserting the light signal into the display signal according to time and a corresponding relationship between the light set units and the video region, and adding a mark to the display signal to describe a feature of the display signal, so as to form the integration signal, and sending the integration signal to the display device;
   in Step 4, when the display signal is a static image, RGB values are respectively divided into X intervals to form an interval with a color space of $X^3$, calculating a color in the color histogram, and obtaining median values of the RGB values in the Y intervals, and combining median values of the Y RGB values to form a main tone color space, and mapping the Y median values to a continuous sequence to generate the light signal based on the distribution of the Y median values in the color space, each of the RGB values in the Y median values having a duration of a second preset interval, and the light signal being a dynamic light signal;
   wherein, X and Y are positive integers, $2 \leq X \leq 50, 0 \leq Y \leq X^3$.

2. The method of claim 1, wherein the display device further comprises a boundary area located around the periphery of the display area and bordering the light area.

3. The method of claim 2, wherein performing Gaussian Blur to the boundary area, such that blurriness of the boundary area increases from the inside of the display area to the outside of the display area.

4. The method of claim 1, wherein in Step S4, when the display signal is a dynamic video, extracting the color space of consecutive video frames of each video region in the display signal, and a average value of the tone data in the color space of the consecutive video frames of the video region is calculated at a first predetermined interval, then generating the light signal of the light set units corresponding to the video region based on the tone data.

5. The method of claim 1, wherein in Step S4, when the display signal is a static image, extracting the tone data of the display signal, and generating the corresponding light signal, wherein the light signal is a static light signal.

6. The method of claim 1, wherein in Step S5, when the light signal is a dynamic light signal, dynamic information of a change of the light signal is obtained, and light change frequency of each light set unit is obtained according to the dynamic information, and generating the display signal corresponding to the change frequency, so as to display a dynamic oscillogram corresponding to the change frequency.

7. The method of claim 1, wherein in Step S5, when the light signal is a static light signal, the tone data of the light signal is obtained, and each of the light set units corresponds to a tone value, and generating a single signal of the video region corresponding to the light set unit, and combining all the single signals to generate the display signal.

8. The method of claim 1, wherein the tone data is represented in a RGB format.

\* \* \* \* \*